Feb. 22, 1949.　　　D. K. WARNER　　　2,462,578
POWER LIFT PLANE

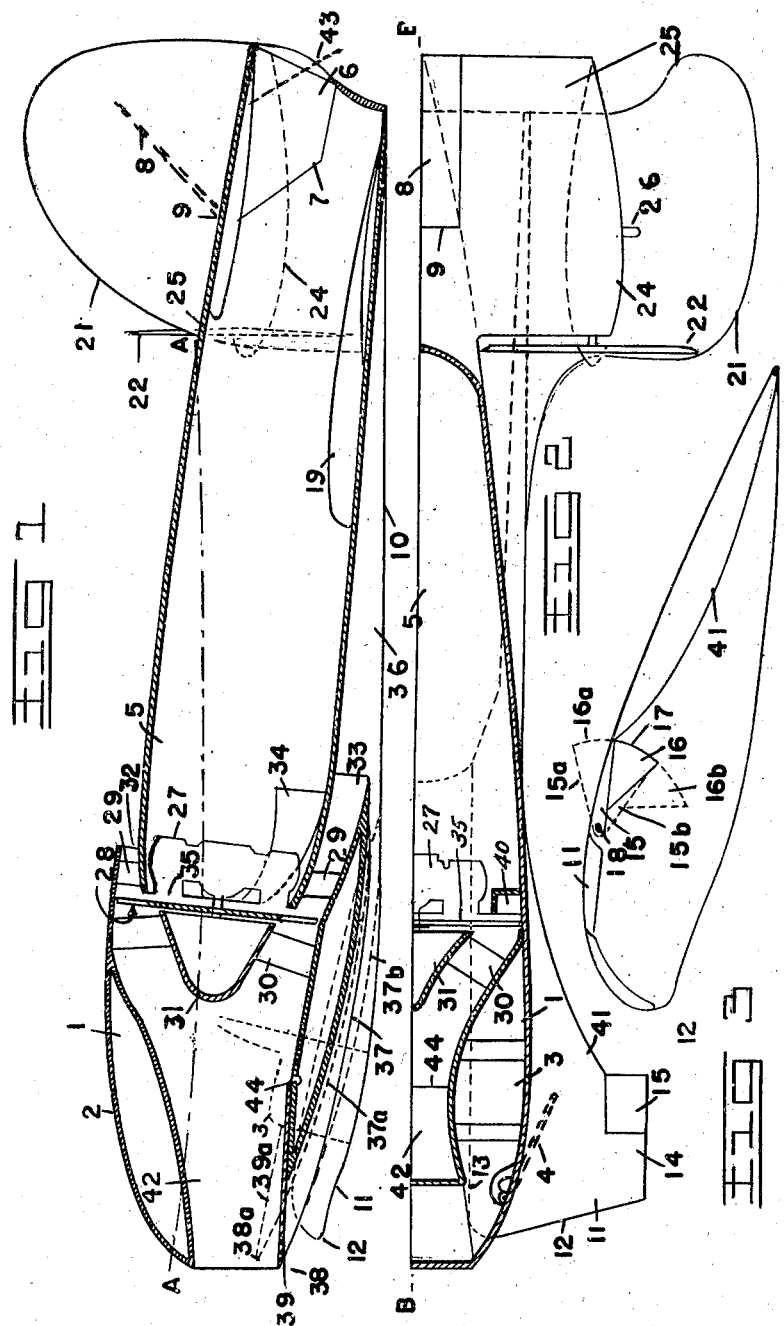

Filed Nov. 29, 1943　　　　　　　　　　　2 Sheets-Sheet 2

Inventor
Douglas K. Warner

Patented Feb. 22, 1949

2,462,578

UNITED STATES PATENT OFFICE 2,462,578

POWER LIFT PLANE

Douglas K. Warner, Sarasota, Fla.

Application November 29, 1943, Serial No. 512,209

11 Claims. (Cl. 244—13)

This invention relates to an airplane dependent for its lift at low speed upon high air velocities created by power means above its top surface. It is shown incorporated in the inventor's compression plane which has formerly been set forth in U. S. Patents Number 2,364,676, 2,364,677, 2,387,627, 2,390,859 and 2,418,380, and application Serial No. 510,843 filed Nov. 17, 1943, now abandoned, as well as in applications pending on internal combustion engines suitable for driving such planes at its higher speeds or in its larger sizes. It is not however, restricted to use in the compression plane, as it may be incorporated in any plane having a wing and a fuselage. The primary object of the invention is the attachment to the lower part of the fuselage a wing so blended into the shape of the fuselage as to form on each side of the fuselage a shape corresponding to the lower half of a horizontally placed Venturi tube and the turning of propellers in the opening of said semi Venturi tubes and the use of second wing attached to the upper part of the fuselage above the first mentioned wing and extending laterally only far enough to house the motors which drive the propellers and which motors accordingly lie on the geometric axis of the lower wing shape.

Other objects of the invention are to so shape the upper wing and the side of the fuselage as to create with the propeller's assistance a pressure of air against the side of the fuselage and the under surface of said upper wing in a manner to drive the plane ahead as well as to partially support it. A further object is to permit all the bracing between the wings of such a biplane to be located within the fuselage thus avoiding their parasite resistance and another object is to provide an opening for entrance to the main portion of the fuselage which will not weaken the body structure, which will permit ease of access on land or in the water and which when opened will provide a good opportunity for mounting of tail guns that will have parasite drag only when opened and the guns are in use, all of said objects being attained by the proper attachment of said wings to the fuselage.

The invention differs only from that described in application 510,843 in that the fuselage is carried its full length at nearly uniform height thereby permitting better passenger loading and more freight storage in small planes and also in providing a more complete diffusion nozzle below the upper wings by carrying the inner walls of said nozzles completely down to join with the wing below, said inner walls of the nozzles being the sides of the fuselage where they taper sharply to the tail.

In the accompanying drawings in which like reference numbers indicate similar parts in all figures—

Fig. 1 is a longitudinal vertical section of the plane at its center line BB.

Fig. 2 is a sectional half plan view, sectioned at AA Fig. 1.

Fig. 3 is an end view of front and floats or stabilizers.

Figure 4:
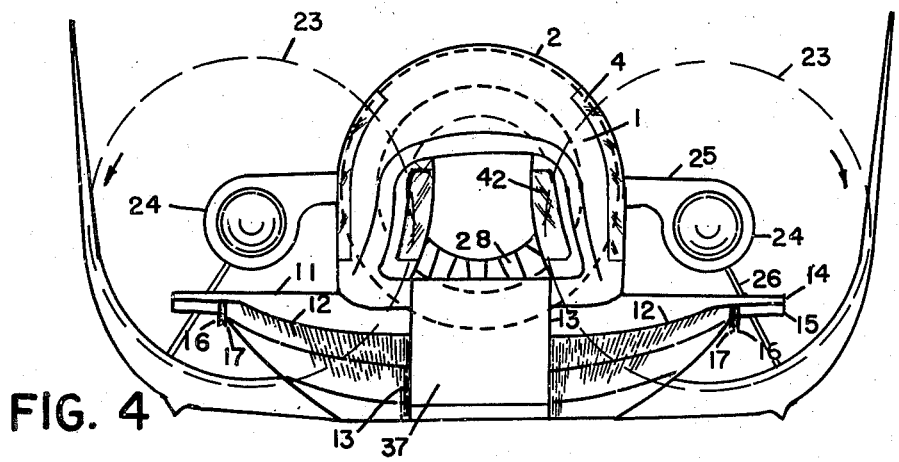
Fig. 4 is front view of plane.

In Fig. 1, No. 1 represents the pilot's cabin with transparent roof and nose 2 and thru which runs the inlet air passage 42. At each side of said passage is located a pilot's seat 3 and an entrance door 4. The rear part of the plane comprises the main body 5 which carries the freight and passengers and to which entrance is made thru doors 6 at the tail swinging downwardly open at hinged edge 7. The roof of the cabin at the tail 8 swings up on hinge 9 so as to permit passengers to easily step in. Each side of the cabin is extended down below its floor level to form the runners 10 upon which the plane rests when standing on land.

Located forwardly, at each side, are the front float stabilizers 11, 12 being their leading edge, 13 the side nearest the ship's center line, and 14 their outboard tips while 41 is the trailing edge of the floats. Ailerons 15 are provided at the float tips and these may also be used as elevators and rudders. Being far ahead of the center of gravity of the plane they are very sensitive, and bank and turn the plane in cooperation rather than with the usual fighting action of ailerons or elevators located behind the center of gravity.

Attached below the inner edge of each aileron is trangular shaped vertical plate 16 and an exactly similar plate 17 is hung below float 11, closely adjacent to plate 16, each so adjusted that when an aileron swings up or down, air will not flow thru any opening formed by moving the aileron above or below the trailing edge of the float. In the upper position, 15A, the aileron will depress the float and its plate 16a will prevent leakage of air past its inner side while in position 15B the plate 17 below the float edge will prevent such leakage. Both plates in normal position have the air resistance surface of only one plate and being below the trailing edge of the airfoil this air disturbance is not seriously detrimental.

Figure 5:
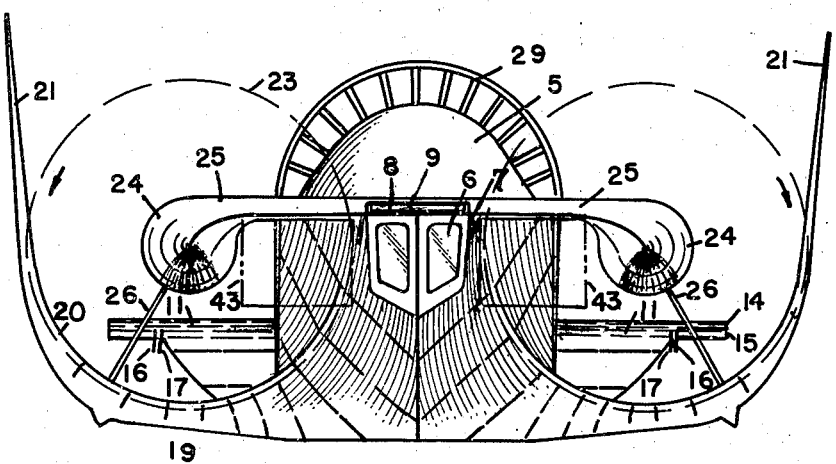
Fig. 5 is a rear view of plane.

In order that the plane may be aerodynamically stable the attack angle of float 11 must be higher than the effective attack angle of the rear wing and it must stall prior to the rear wing and as its air lift must be much less than the rear wing while still being large enough to float the front portion of the plane it must have an extremely low aspect ratio resultant in a very late stall all of which requires means for retarding the stall point of the rear wings such as the forced draft from the propellers circling within the wing. The ailerons are very small due to their unique location and may be turned by turning their tubular supporting shaft 18. The rear wing 19 blends into the fuselage in a manner that its top surface may form a truly circular path for the propeller without changing the attack angle of laterally varying parts of the wing and still maintaining the chord lines in a constant plane of very slight dihedral. This is accomplished by rapidly lengthening the chord close to the fuselage. 20 shows the wing as it bends up on the outside around the propeller and it will be noted that even here the area of passage at the trailing edge is greater than at the leading edge where the propeller swings and greater yet than at the high point of the chord where the wing thickness plus camber produces the throat of the semi-Venturi tube. The air leaves the tips of the propeller blades with maximum velocity as these are never at an angle beyond the stall point at zero plane velocity and as the tips always move faster than any other part of the propeller the energy of the air at the end or tip of a propeller blade is accordingly about ten times greater than half way between the tip and the center of the propeller. This tip energy is increased by crowding the air in the Venturi tube shape to create a still higher air velocity at the throat where the maximum lift per sq. ft. is obtained on the wing surface and then as the air sweeps back and inward over the wing it crowds up against the side of the fuselage and under the upper wing where it is trapped by the engine nacelle thus creating a favorable pressure zone under this wing and against the converging fuselage walls. As both propellers turn downwards on their outboard side the air sweeps downward and backward over the inside surface of fins 21 and over the wing 19 as before stated. The high velocity over the fins gives the plane complete yaw stability even before it starts to move, a result hitherto desired but not attained before the building of my plane described in application 510,843. This direction of turn is shown in the path 23 of the propeller tips. The engine nacelle is supported by stub wing 25 in a lower position than the chord line of the upper wing so as to trap the air swept around by the induced drag of the propeller blades. The wing 25 is thus enabled to convert the revolving energy in the propeller slip stream, caused by induced drag, and friction drag into forward propulsion and lift by stopping the twist of the slip stream on the upward moving side only and in the diffuser nozzle formed by the nacelle, the upper wing and the side of the fuselage. The streamlined rod 26 extending from the engine to an outer portion of the lower wing may be provided to stiffen the wing structure which is already of maximum stiffness and strength due to its very short length. The fuselage has a flat top and concave sides at the rear which are part of the diffuser nozzle construction, and it has a tubular shape at the forward end which forms the housing for engine 27 shown here as a radial air cooled engine tho any type may be used. The forward engine 27 drives a pressure fan 28 which discharges its air around nearly all the wall surface and floor and roof surface of cabin 5. Figure 5 shows how the air from the upper half of the fan is expelled over the semi-cylindrical roof of the cabin 5 past the stationary reversing blades 29. These blades straighten out the twisting air discharge of the fan like the half wings 25 restored the loss from the propeller slip stream and they also serve to structurally tie together the forward cylinder surrounding the fan and pilot's cabin with the rearward cylindrical passenger cabin 5, further structural strength being added by the heavy runners 10 and the sides of the plane which are common to both cabins. Since the first point of contact with the water at speed is directly below the forward end of cabin 5 all the heavy structural stresses are carried by the large tubular shaped cabin 5 and the heavy runners 10 below it. In case the plane were used for war purposes the forward part of this cabin could form the bomb bay with its bottom formed of doors to drop the bombs. As the floor of this portion of the cabin is above the water level while floating the doors need not close watertight. The rear portion of the cabin forms the rear gunner's cockpit. The floor of the cabin slopes down rearwardly until at the tail it is almost level with the bottom of runners 10, thereby trapping the air under the body which has been discharged by the lower part of the fan 28 thru the diffuser 33.

Ahead of the fan the air is prevented from swirling by the longer stationary blades 30 which connect the air divider 31 with the outer walls of cabin 1.

It will be noted that the exit passages 32 and 33 of fan 28 differ at top and bottom in that at the top the area is contracted while below it is enlarged and the passages 33 considerably lengthened to permit slow efficient diffusion for converting velocity energy to pressure. On the downward sweeping side of the fan below its center line part of the fan's discharge is drawn into cabin 5 thru diffuser nozzle 34. This air elevates the cabin pressure and provides the first stage of super charge for the engine and also supplies air for cooling the engine fins which air is ejected thru passages 35 to the rear of the fan disc.

The air compressed under the plane in diffuser 33 is trapped in compression space 36 by the runners 10 at the sides, the surface beneath, be that land, water, or, (in the case of high plane speeds) air. Flap 37 drops to contact a surface and prevents escape of air forward. This flap is hinged at 38 to upper flap 39 which itself is hinged to bottom of inlet passage 42 at 44. Moving flap 39 upwards to position 39A reduces the air inlet area and increases the pressure of the air entering fan 28 by ram effect at high speed and permits lowering again if the engine stops. In either position the lower flap 37 is free to move over waves as shown in 37A and 37B.

The plane as described has yet to be wind tunnel tested and it may be found necessary to install the automatic pilot wings previously described but not shown on these drawings or it may be necessary to connect the ailerons 15 or flaps 43 to automatic devices shuch as shown in application 510,843 in order to catch the plane at first sign of engine stoppage before a resulting high attack angle has stalled the ailerons and ruined their ability to control the plane.

On the upward moving side of the fan 28 a partial scroll passage 40 carries air to the upper portion or roof of the plane. More than half the fan output, is discharged above the body, a much lesser portion of the fan's output is discharged beneath, thereby making it possible to slow the air down and increase its pressure below the plane. A small amount of air from the lower sector of the down moving blades is drawn in and diffused inside the body for engine use.

It may be noted that the attack angle of the tip of the front float is less than the attack angle of the root of the float. The chief reason for giving the tip a lesser angle is to retard the stall point of the aileron so that it may remain effective at high plane attack angles. The flaps 43 are extendable downwardly and rearwardly below the tail of upper wing 25 to close the inverted channels formed between engine nacelles and the fuselage walls to prevent stall on landing.

Having thus described my invention what I claim as new is:

1. In an airplane, propellers and a lift providing fuselage having a depth of more than half a propeller diameter and having a greater lower width than upper width, and having sides concaved in substantially ¼ circle segments, and having wings extended from its lower portion and continued outwardly upwardly in a manner to form with said concaved fuselage walls, troughs extended below said propellers parallel to the center line of said fuselage and of substantially semi-cylindrical form in cross section, said propellers being above the forward portion of said wing troughs.

2. In an airplane as described in claim 1, said curved wings being comprised of many sections all of like attack angle and similar airfoil shape but of autwardly decreasing thickness and, inwardly of the vertical center line of said trough, of rapidly increasing chord length to an extent to provide an inwardly rising top surface to conform with the circular form of the trough, and to provide adjacent said fuselage a downwardly extended lower surface for supporting the airplane in water, all with constant airfoil characteristics other than thickness and length of chord ratios. Said chord extension being provided forwardly, and the length of the chord of said wing at its junction with said fuselage being nearly double the wing chord under the outer portion of said propellers, whereby said increased airfoil section at the junction of fuselage and wing forms a large displacement float of air foil shape capable with its counterpart on the opposite side of said fuselage of supporting practically the total weight of the plane whenever said plane is floating on the water, and so designed that it will take upon itself the function of so supporting said airplane in the water.

3. In an airplane, a fuselage and a wing extending each side from the top thereof, propellers extending beyond the wing tips a full blade length and oppositely in front of the full length of said wing extension, long diameter, streamlined, elipsoidal, bent down and smoothly continuously curved wing tips, completely free from obstruction to air blown downwardly thereover by said propellers, main trough shaped wings below said first mentioned wing and said propellers said trough shaped wings being circumscribed about said upper wing tips, the innermost arcuate surface of said trough shaped wings being formed directly in the fuselage surface.

4. In an airplane as described in claim 3 and the tips of said trough shaped wings extended upwardly, outwardly higher than said first mentioned wing.

5. In an airplane as described in claim 3 having both said main trough shaped wings and said upper motor supporting wings at the extreme rear of said fuselage and having a rapid tapering off of thickness of fuselage rearward of said propellers and a trailing edge of said fuselage sloping upwardly forwardly to the bottom of said upper wing and said upper wing having a lower surface inclined upwardly at its rear portion and said large diameter, streamlined, elipsoidal bent down wing tips contracted to a downward sloping thin trailing edge having an inner surface which rearwardly becomes further removed from said airplane's center line whereby all said surfaces form an inverted rearwardly diffusing channel beneath said upper wing wherein the blasts from the propeller blades may be slowed down and an air pressure thereby created which lifts the plane and pushes it forward.

6. In an airplane, a fuselage, a wing at the rear thereof extended from the fuselage top surface and a trough shaped wing partly formed in the side of said fuselage and partly extended outwardly and upwardly from the rear of said fuselage, said first wing being large diameter, streamlined, elipsoidal and smoothly bent down at its tips and motors housed in said tips, propellers having blades and blade tips mounted forward of said motors said blades moving upwardly in front of said wing and said tips passing close above the trough like wing surface below them and imparting upward blasts of air beneath said first wing each time a propeller blade passes the front of said wing which said upward blasts of air are immediately followed by air moving rearwardly with less upward inclination thereby varying the angle of attack in a manner to greatly reduce and even entirely eliminate the drag of said wing, in a manner similar to that producing the negative drag set up by air moving over sea waves on the lower wing of this aforementioned airplane when it is safely skimming very close to the surface of a rough sea.

7. In an airplane, a fuselage and propellers said fuselage having a depth of more than half the propeller diameter and at the section near said propellers having indented sides sloping upwardly inwardly in close conformation to the arcs transscribed by the tips of said propellers and wings extended outwardly, upwardly beneath said propellers from the lower portion of said fuselage forming troughs closely fitting the slip streams of said propellers, a wing extended outwardly from the top of said fuselage and having bent down, large diameter, streamlined, elipsoidal tips rearward of said propellers and said propellers turned in opposite directions so that all blades move upwardly in front of said wings and downwardly around said tips in a manner to blow air down around the said tips oppositely to normal wing tip vortex flow and to blow air periodically upwardly in front of said wing in a manner to produce a very rapid and favorable Katzmayr action on said wing, each time a propeller blade passes up in front of said wing.

8. In an airplane as described in claim 7 lower wings of greater chord than the aforesaid wing extended from the fuselage top surface and said lower wings extended far forwardly of said upper wing in a manner that the said propellers are above the forward portion said larger wings being extended from the lower portion of said fuselage whereby troughs are formed partly in the sides of said fuselage and partly in the lower wings, said troughs conforming closely to the lower half of the slip stream of said propellers, whereby lift is imparted to the top surface of said trough wing due to air velocity at propeller tips.

9. In an airplane as described in claim 7 said side indentations of fuselage about said propeller orbit being located at the rear of said fuselage and the upper portion of said fuselage being rapidly narrowed to a vertical trailing edge, forming thereby, with the bottom surface of said upper wing, a diffusing passage in which the velocity energy of said propellers slip stream is transformed to pressure energy whereby a forward impetus is given to the tapered trailing edge of said fuselage and a lifting force is applied beneath said wing.

10. In an airplane as described in claim 7, wings of greater area than the aforesaid top wing extended outwardly and upwardly below said propellers and built in a shape to form with said fuselage sides, troughs beneath said propellers closely fitting the bottom orbit of said propeller's tips, and said lower wings of greater area extended further in an upwardly outwardly direction to form tail fins whereby air is prevented from running over the wing tips to reduce the air velocity above the wing and whereby the plane is made stable in yaw without adding additional drag producing tail surface therefor.

11. In an airplane having oppositely positioned propellers mounted outside the fuselage thereof, a laterally projecting wing positioned immediately below the propeller sweeps, said wing having intermediate portions curved adjacent and conforming to said propeller sweeps for about 180 degrees of their lower arc and straight upwardly inclined extremities forming tail fins in combination with said curved wing portion extended upwardly as high as the propeller circle.

DOUGLAS K. WARNER.

REFERENCES CITED

The following references are of record in the file of this patent:

UNITED STATES PATENTS

| Number | Name | Date |
|---|---|---|
| 1,058,983 | Kikut | Apr. 15, 1913 |
| 1,060,273 | Melotte | Apr. 29, 1913 |
| 1,200,512 | Matta | Oct. 10, 1916 |
| 1,754,733 | Yohe | Apr. 15, 1930 |
| 1,772,196 | Wallace | Aug. 5, 1930 |
| 1,855,652 | Sanders | Apr. 26, 1932 |
| 1,986,064 | Leray | Jan. 1, 1935 |
| 2,081,436 | Martin | May 25, 1937 |
| 2,194,596 | Henter | Mar. 26, 1940 |
| 2,341,577 | Stewart | Feb. 15, 1944 |

FOREIGN PATENTS

| Number | Country | Date |
|---|---|---|
| 424,373 | France | Mar. 13, 1911 |
| 547,240 | France | Sept. 15, 1922 |
| 763,758 | France | Feb. 19, 1934 |
| 784,301 | France | Apr. 29, 1935 |
| 473,682 | Great Britain | Jan. 15, 1936 |
| 49,917 | France | June 16, 1939 |

(Additional to 796,140)